United States Patent
Desjoyeaux et al.

(10) Patent No.: US 11,141,960 B2
(45) Date of Patent: Oct. 12, 2021

(54) COMPOSITE PART WITH SMOOTH OUTER FACE AND MANUFACTURING METHOD THEREOF

(71) Applicants: Safran Nacelles, Gonfreville l'Orcher (FR); Safran Ceramics, Le Haillan (FR)

(72) Inventors: Bertrand Desjoyeaux, Moissy Cramayel (FR); Davi Silva De Vasconcellos, Moissy Cramayel (FR); Aline Planckeel, Moissy Cramayel (FR)

(73) Assignees: Safran Nacelles, Gonfreville l'Orcher (FR); SAFRAN CERAMICS, Le Haillan (FR)

( * ) Notice: Subject to any disclaimer, the term of this patent is extended or adjusted under 35 U.S.C. 154(b) by 104 days.

(21) Appl. No.: 16/555,575

(22) Filed: Aug. 29, 2019

(65) Prior Publication Data

US 2020/0071234 A1     Mar. 5, 2020

(30) Foreign Application Priority Data

Aug. 29, 2018  (FR) ...................................... 18/57755

(51) Int. Cl.
*C04B 35/64*     (2006.01)
*B32B 18/00*     (2006.01)
(Continued)

(52) U.S. Cl.
CPC .............. *B32B 18/00* (2013.01); *B28B 1/002* (2013.01); *B64C 1/00* (2013.01); *B64D 29/00* (2013.01);
(Continued)

(58) Field of Classification Search
CPC ........ C04B 35/62849; C04B 35/62852; C04B 35/62863; C04B 35/64; C04B 35/565;
(Continued)

(56) References Cited

U.S. PATENT DOCUMENTS

| | | | |
|---|---|---|---|
| 5,315,820 A | * | 5/1994 | Arnold .................... B32B 3/266 60/226.1 |
| 2010/0081350 A1 | | 4/2010 | McCabe et al. |

(Continued)

FOREIGN PATENT DOCUMENTS

| | | | | |
|---|---|---|---|---|
| EP | 3075531 | * | 10/2016 | ............... B32B 1/00 |
| JP | 2017057123 | | 3/2017 | |

*Primary Examiner* — Noah S Wiese
(74) *Attorney, Agent, or Firm* — Burris Law, PLLC

(57) ABSTRACT

A part for an aircraft turbojet engine nacelle is made of a composite material and includes at least one outer face (S1), a fibrous preform including fiber locks and having a surface (s) delimiting depressions between fiber locks, a covering material which at least partially covers the surface(s) of the fibrous preform and in particular the depressions, and a matrix which binds entirely the covering material and the fibrous preform. The covering material is a fibrous mat and the outer face (S1) is smooth. A method for manufacturing such a part includes manufacturing the fibrous preform, providing a fibrous mat, depositing the fibrous preform and fibrous mat in a mold, dispersing the matrix between the fibers of the preform and mat and consolidating the fibrous preform and mat.

24 Claims, 2 Drawing Sheets

(51) Int. Cl.

| | |
|---|---|
| *C04B 35/628* | (2006.01) |
| *B64D 29/00* | (2006.01) |
| *B64C 1/00* | (2006.01) |
| *B64F 5/10* | (2017.01) |
| *B28B 1/00* | (2006.01) |
| *C04B 35/117* | (2006.01) |
| *C04B 35/18* | (2006.01) |
| *C04B 35/565* | (2006.01) |
| *C04B 35/80* | (2006.01) |

(52) U.S. Cl.
CPC .............. *B64F 5/10* (2017.01); *C04B 35/117* (2013.01); *C04B 35/18* (2013.01); *C04B 35/565* (2013.01); *C04B 35/62849* (2013.01); *C04B 35/62852* (2013.01); *C04B 35/62863* (2013.01); *C04B 35/64* (2013.01); *C04B 35/80* (2013.01); *C04B 2235/3217* (2013.01); *C04B 2235/3463* (2013.01); *C04B 2235/3826* (2013.01); *C04B 2235/5224* (2013.01); *C04B 2235/5228* (2013.01); *C04B 2235/5244* (2013.01); *C04B 2235/5252* (2013.01)

(58) Field of Classification Search
CPC ................. C04B 35/117; C04B 35/645; C04B 2235/3463; C04B 2235/5244; C04B 2235/5224; C04B 2235/5228; C04B 2235/5252; C04B 2235/3826; C04B 2235/3217; B64D 29/00; B64C 1/00; B64F 5/10; B28B 1/002
See application file for complete search history.

(56) References Cited

U.S. PATENT DOCUMENTS

| | | | |
|---|---|---|---|
| 2013/0011271 A1* | 1/2013 | Shi | ............................ F01D 5/28 416/230 |
| 2016/0305321 A1* | 10/2016 | Pujar | ...................... B64D 15/12 |
| 2018/0065337 A1* | 3/2018 | Grasso | .................... B32B 15/04 |

* cited by examiner

COMPOSITE PART WITH SMOOTH OUTER FACE AND MANUFACTURING METHOD THEREOF

CROSS-REFERENCE TO RELATED APPLICATIONS

This application claims priority to and the benefit of FR 18/57755 filed on Aug. 29, 2018. The disclosure of the above application is incorporated herein by reference.

FIELD

The present disclosure relates to a part made of a composite material with at least one smooth outer face for an aircraft turbojet engine nacelle, and in particular including an aerodynamic surface, and a manufacturing method thereof.

BACKGROUND

The statements in this section merely provide background information related to the present disclosure and may not constitute prior art.

The term smooth outer face means a non-roughened outer surface, without any recess, depression or crack.

It is known to make parts made of a composite material from fibrous preforms and a matrix. A fibrous preform is made by disposing layers of fibers, also called laps, successive superimposed layers, each layer including either woven fiber locks, so-called fibrous tissues, or fiber locks disposed substantially parallel to each other, in a tooling including at least one upper face and one lower face intended to sandwich said layers.

The term fiber locks means groups of fibers.

In the remainder of the description, the terms tooling and molds will be used interchangeably.

The preform thus obtained has recesses between the fibers and on the surface. Such recesses are filled by a matrix, for example injected into the tooling. A consolidation step by heat treatment allows obtaining a part made of a composite material.

However, the matrix present in the recesses, then called matrix pocket, causes crack starts due to the shrinkage of the matrix, in particular during temperature variation during the consolidation of the matrix by heat treatment. Thus, the aerodynamic and mechanical performance of the part made of a composite material are altered.

U.S. Patent Publication No. 2010/0081350 addresses this issue, in particular for silicon carbide or boron-based ceramic matrix composite materials, by filling these recesses with a mixture of matrix and short fibers.

The term short fibers means cut fibers, called whiskers, with a length such that they could split each recess in sufficiently small volumes, reducing the dimensional shrinkage of the matrix and thus the cracks or detachments in the composite.

A drawback of this solution is that filling of the recesses with short fibers is difficult and expensive.

Furthermore, the short fibers reduce the matrix shrinkage but do not prevent it. Thus, cracks may still appear.

A machining step by surface smoothing may also be carried out to smoothen the surface of composite parts of the prior art.

This step has the drawback of being expensive and causing fractures of fibers at the surface.

SUMMARY

The present disclosure provides smooth parts made of a composite material, whose outer faces do not have cracks opening onto the outer face, and whose manufacturing method is simplified.

To this end, the present disclosure provides a part for an aircraft turbojet engine nacelle, the part being made of a composite material, wherein the part has at least one outer face, and includes:

a fibrous preform including fiber locks and having a surface delimiting depressions between fiber locks;

a covering material which at least partially covers the surface of the fibrous preform and in particular the depressions; and a matrix which binds entirely the covering material and the fibrous preform, wherein the covering material is a fibrous mat and the outer face is smooth.

The term fiber locks means a group of fibers parallel to each other.

The depressions between fiber locks are depressions on a macroscopic scale with a height between one and two times the height of a fibre locks.

The term fibrous preform means a flexible texture aiming at obtaining a solid part after matrix dispersion, addition of fibrous mat according to the present disclosure, and consolidation.

The term matrix dispersion means either a matrix addition, for example by injection, or a migration of a matrix present in the preform in the case where it is a matrix pre-impregnated preform.

The fibrous preform is composed by a superposition of laps including fiber locks disposed according to different orientations. The fiber locks of the same lap may be woven together according to 2D or 3D weaving patterns, and/or according to braiding patterns, and/or disposed in strips that follow the draping surface of the part to be produced according to any method of draping, deposition or winding.

The term surface of the fibrous preform means the envelope circumscribing the fiber locks of the fibrous preform. Said surface has depressions, that is to say recesses between said envelope and the contours of the locks visible from said surface.

The term covering material means a solid material.

The term fibrous mat means a manufactured product constituted by a web or a lap of fibers that are distributed directionally or randomly and whose internal cohesion is provided by mechanical and/or physical and/or chemical processes and/or by combination of these various processes, excluding weaving and knitting.

Thus, the fibrous mat is unwoven.

In this way, the fibrous mat covers the depressions of the fibrous preform and in particular the depressions between the surface locks of the fibrous preform, and inhibits the creation of matrix cracks opening onto the surface, that is to say onto the outer face of the part, in particular the creation of cracks that have an opening on the outer face of the part, such as a crevasse.

The outer face of the part made of a composite material thus obtained is smooth, which allows obtaining a part with a better aerodynamic, mechanical and aesthetic quality.

More specifically, at least one fiber of the fibrous mat extends substantially parallel to the outer face of the part and above at least one depression between at least two fiber locks of the fibrous preform.

The term "above at least one depression" means that the fibrous mat includes at least one fiber which extends totally over the length of a depression, that is to say a fiber whose length is longer than the largest dimension of the depression, that is to say than the length of the depression.

The fibrous mat includes at least one long fiber, as opposed to short fibers.

The presence of fibers of the fibrous mat above a depression between locks of the fibrous preform inhibits the creation of cracks opening at the level of this depression between the locks.

Thus, the mechanical strength of the material is improved, and so is the aerodynamic quality.

In one form of the present disclosure, the fibers of the fibrous mat are long, discontinuous and oriented in random directions.

As example, the discontinuous long fibers have a length in the range of 10 to 100 mm.

In another form of the present disclosure, the fibers of the fibrous mat are long, continuous and are disposed along random curves in the plane of the fibrous mat.

As example, the continuous long fibers have a length corresponding to the entire length of the fibrous mat.

In another form of the present disclosure, the fibrous mat is constituted by a combination of discontinuous and continuous long fibers oriented according to random directions and curves in the plane of the fibrous mat.

According to one feature, the thickness of the fibrous mat is smaller than half the thickness of a fiber strand of the fibrous preform.

According to another feature, the thickness of the fibrous mat is smaller than one-fifth of the thickness of a fiber strand of the fibrous preform.

Thus, advantageously, the fibrous mat constitutes a very thin layer with regards to the fibrous preform.

Since the fibrous mat is thin, its low surface weight barely penalizes the total mass of the composite part.

According to another feature, the fibrous mat may include up to at least five superimposed fibers across its thickness at one point.

According to another feature, the fibrous mat may include up to at least ten superimposed fibers across its thickness at one point.

Thus, advantageously, the fibrous mat has a very fine fiber structure throughout its surface combining multiple fiber orientations at one point and low spacing between two fibers.

Advantageously, the presence of this fibrous mat on the outer face of the part inhibits the creation of significant surface cracks, significantly improves the mechanical strength of the part made of a composite material in particular thermomechanical fatigue.

According to one form, the fibrous preform includes ceramic fibers, selected from the group consisting of carbides, silicon carbide (SiC), borides, oxides, and silicides.

In another form, the fibers of the fibrous preform are alumina ($Al_2O_3$) or aluminosilicates-based fibers, and in one example are at least 60% alumina-based fibers.

According to this form, the fibrous mat advantageously includes ceramic fibers, selected from the group consisting of carbides, silicon carbide, borides, oxides, and silicides.

According to this form, the fibers of the fibrous mat are alumina or aluminosilicates-based fibers, and in one example are at least 60% alumina-based fibers.

Still according to this form, the matrix which binds the entirety of the covering material and of the fibrous preform is a ceramic matrix, such as for example, a ceramic matrix selected from the group consisting of carbides, silicon carbide (SiC), borides, oxides, and silicides.

In a further example, the matrix is an alumina ($Al_2O_3$) or aluminosilicates-based matrix, and in one form is at least 60% alumina-based matrix.

According to this form, this is called a ceramic matrix composite (CMC).

The present disclosure also concerns a method for manufacturing a part as previously described, including:
a step of manufacturing a fibrous preform;
a step of providing a fibrous mat;
a step of depositing the fibrous preform and the fibrous mat between two faces of a mold;
a step of dispersing the matrix between the fibers of the fibrous preform and of the mat; and
a step of consolidating the fibrous preform and the fibrous mat, in which the matrix dispersed between the fibers of the fibrous preform and of the fibrous mat is heat-treated.

The term "step of dispersing the matrix between the fibers of the fibrous preform and of the mat" means a step during which the matrix is added and/or migrates between the fibers of the fibrous preform and of the mat.

The fibrous mat is intended to form the covering material of the fibrous preform.

The matrix is added between the fibers of the fibrous preform and of the mat, for example by injection.

The matrix migrates between the fibers of the fibrous preform and of the mat, for example when the fibrous preform and/or the mat are pre-impregnated with the matrix.

A combination of these two alternatives of matrix dispersion between the fibers of the fibrous preform and of the mat may also be envisaged.

The consolidation step allows providing cohesion between the fibers.

According to one form, the consolidation step is a thermomechanical treatment step.

According to this form, the consolidation step includes drying and sintering phases at temperatures ranging from 50 to 1500° C.

In another form of the method, at least one portion of the matrix dispersion step is carried out during the manufacture of the fibrous preform and/or beforehand during a step of manufacturing the mat.

According to this form, the fibrous preform and/or the mat are pre-impregnated with the matrix in liquid or pasty solution dispersed between the fibers.

In another form, the matrix dispersion step is carried out in the mold, by liquid or solid infiltration, after deposition of the fibrous preform and the mat.

In another form of the method, at least one portion of the matrix dispersion step is carried out by injection of the matrix into the mold including the fibrous preform and the fibrous mat.

According to this form, the injection is performed through an inlet point located in a face of the mold, said mold including at least one outlet vent located in the opposite face of the mold, enabling the evacuation of gases, solvents, or binder liquids.

Alternatively, the at least one vent is disposed on the face of the mold in contact with the fibrous mat.

According to this form, the fibrous preform is a dry fibrous preform and the mat is a dry fibrous mat.

The dry fibrous mat includes a small proportion of binder to bind the fibers.

Advantageously, the binder of the fibrous mat is soluble by the binder of the matrix or by another solvent compatible with the tooling environment.

In a first form, the step of manufacturing the fibrous preform is performed in the mold.

The step of manufacturing the fibrous preform is performed by automatically or manually depositing laps of fiber locks, whether woven or not, in a superimposed manner on one side of the mold.

According to this first form, the fibrous mat is deposited on the fibrous preform, during the deposition step, automatically or manually.

In a second form, the fibrous mat is deposited on at least one of the faces of the mold, automatically or manually.

According to this second form, the step of manufacturing the fibrous preform is carried out in the mold, on this fibrous mat, automatically or manually.

In the variant according to which the fibrous mat is deposited on only one of the two faces of the mold, the step of depositing the fibrous mat is repeated, in the mold, either on the fibrous preform or on the other face of the mold, automatically or manually.

According to this variant, a fibrous mat covers each of the two opposite faces of the fibrous preform allowing covering the depression between the fibers of each face of said fibrous preform.

In one variant, the fibrous mat is deposited only on the depressions between fiber locks of the fibrous preform.

In another variant, the fibrous mat is deposited on the entirety of the fibrous preform, including in the areas without depressions between locks of the fibrous preform.

According to one feature, the two faces of the mold are made of a rigid material such as a solid metal material, or of a deformable semi-rigid material such as an elastomeric material, or a combination of these two types of materials.

In one form, the mold includes means which force the distribution of the matrix in the fibrous preform and the fibrous mat.

According to one feature, these means are a part made of a porous material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
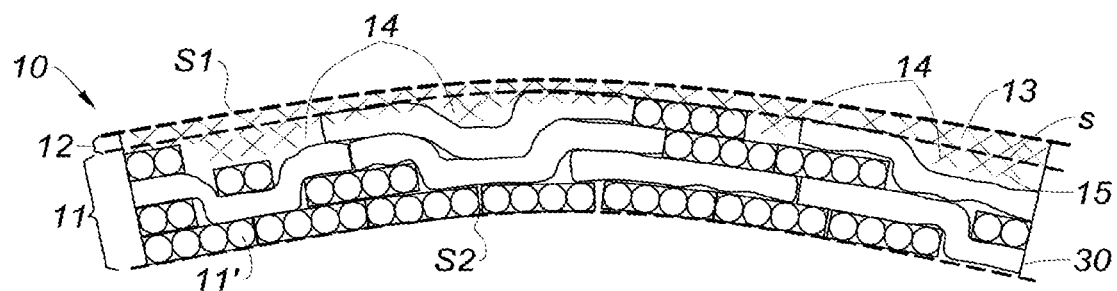
FIG. 1 is a schematic sectional view of a part made of a composite material according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a part 10 made of a composite material, having a smooth outer face S1, and an inner face S2.

The part 10 includes a fibrous preform 11, a fibrous mat 12, an alumina based ceramic matrix 13, which binds the entirety of the fibrous mat 12 and of the fibrous preform 11.

The fibrous preform 11 includes four laps 30 of fibers grouped together in the form of fiber locks 11'.

Each of these locks each includes a plurality of fiber filaments (not represented) disposed parallel to each other.

The locks 11' of the same lap 30 have various directions in the outer face plane S1.

In the plane of the section of FIG. 1, some locks 11' are parallel to the sectional plane (locks represented by serpentine shapes) and others are intersecting (locks represented by circles or ellipses).

The fibrous preform 11 has a surface "s" delimiting depressions 14 between some locks 11'.

The fibrous mat 12 includes fibers 15. It covers the surface "s" of the fibrous preform 11 and in particular the depressions 14.

Because of the orientations and arrangements of locks 11' and the rigidity of the fibers which inhibits them from being deformed without the risk of breaking, the depressions 14 have an increased width corresponding to the width of two locks, and a depth corresponding to the thickness of one to three laps 30 of locks 11'.

In various forms, the fibrous mat 12 has a maximum thickness of half the thickness of a lap 30 of the fibrous preform 11, a thickness of one-third of the thickness of a lap 30 of the fibrous preform 11, or a thickness of one-fifth of the thickness of a lap 30 of the fibrous preform 11.

The fibrous mat 12 includes fibers 15 randomly disposed and interconnected by any mechanical, physical and chemical means, but not woven or knitted.

As example, the part 10 is made of a composite material with an aluminum oxides ceramic matrix and whose fibers of the fibrous preform 11 and of the fibrous mat 12 are alumina fibers, and in one form includes at least 60% of alumina, grouped together in locks 11' with a linear density comprised between 3,000 and 20,000 deniers. The width of each fiber is generally smaller than 20 µm, and in one example the width of each fiber is between 10 and 15 µm.

According to this example, the envelope section of fiber locks 11' of the fibrous preform is substantially oval or ellipsoidal with a larger width comprised between 2 mm and 15 mm.

A lap 30 of locks 11' composed by alumina-based fibers having a density between 3.2 and 3.9, and a fiber volume ratio in the range of 50%, has a basis weight comprised between 80 g/m$^2$ and 250 g/m$^2$ and a thickness comprised between 0.08 and 0.3 mm.

In the case of woven locks 11', a lap of woven locks of the fibrous preform 11 may have a thickness comprised between 0.15 and 0.4 mm.

The depressions 14 have a maximum width in the range of 1 to 30 mm in width and in the range of 0.1 mm to 1 mm in depth.

Still according to this example, the fibrous mat 12 has a basis weight comprised between 10 and 70 g/m² of alumina fibers, such as for example, a basis weight between 15 and 50 g/m²; and a thickness comprised between 0.02 and 0.3 mm, such as for example, between 0.03 and 0.15 mm.

Figure 2:
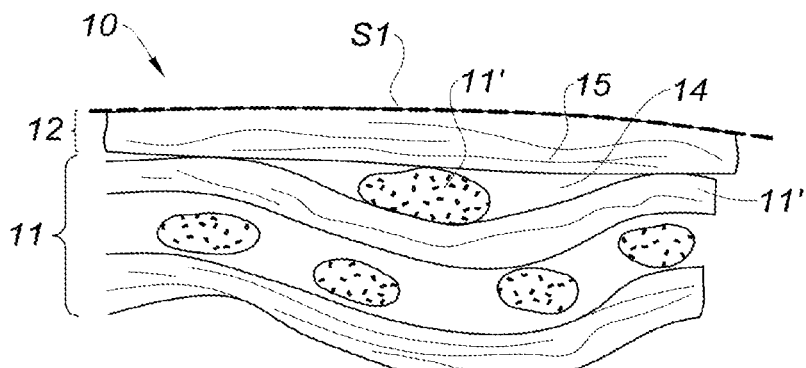
FIG. 2 is an enlarged schematic sectional view of a variant of a part made of a composite material according to the present disclosure.

In a variant represented in FIG. 2, the fibers 15 of the fibrous mat 12 are long fibers disposed in planes parallel to the outer face S1 of the part 10.

Furthermore, the fibers 15 of the fibrous mat 12 extend over at least two locks 11' of the fibrous preform, covering at least one depression 14.

The fibrous mat 12 includes at least one fiber 15 whose length is longer than the largest width of the depressions 14 between the locks 11' of the fibrous preform 11.

At least one portion of the fibers 15 of the fibrous mat 12 has a length comprised between 2 and 30 mm.

In one form, the fibrous mat 12 is made from fiber locks with an initial linear density comprised between 1,000 and 20,000 deniers. The locks are spread out, so as to distribute their constituent fibers so as not to have more than 100 fibers clusters parallel to each other, or less than 100 deniers.

The locks may also be cut so as to have lengths of fibers of about 15 mm.

In another form, the fibrous mat 12 includes at least 50% of total mass comprising fibers with lengths longer than 15 mm.

In still another form, the fibrous mat 12 includes more than 50% fibers of lengths comprised between 15 and 50 mm.

The fibers 15 of the fibrous mat 12 are randomly oriented in multiple directions in the plane of the fibrous mat, and distributed so that: in any 5 mm² surface of the fibrous mat, at least five fibers clusters may be observed in different directions.

In another form, the fibers 15 are distributed and crossed with each other in the fibrous mat 12 so that there is no gap between fibers longer than 2 mm and wider than 1 mm.

In yet another form, the fibers of the fibrous mat are bound together by a water-soluble product, for example a polyvinyl or glycol polyethylene alcohol based product.

Figure 3:
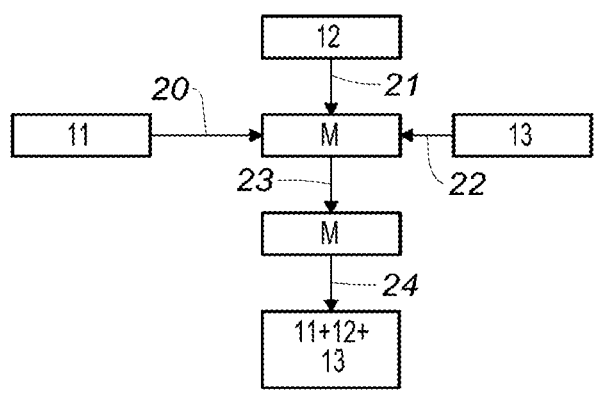
FIG. 3 is a schematic representation of a method according to the present disclosure.
Figure 4:
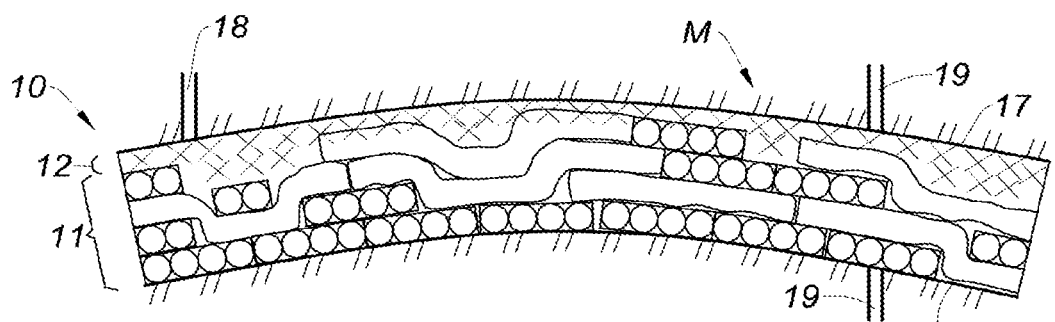
FIG. 4 is a schematic sectional view of a part made of a composite material disposed in the mold according to the present disclosure.

FIG. 3 illustrates one form of the method for manufacturing the part 10 as previously described, in which the first step is a step of manufacturing 20 the fibrous preform 11, by depositing laps 11' of fibers in a mold M including a first face 16 and a second face 17 (FIG. 4).

During this step 20 of manufacturing the fibrous preform, the laps 11' are deposited on the first face 16 of the mold (FIG. 4)

The first face 16 and the second face 17 have complementary shapes.

Then a step 21 of depositing a fibrous mat 12 is carried out on said fibrous preform 11 and the mold M is closed so that the first face 16 and the second face 17 trap the fibrous mat 12 and the fibrous preform 11. In this step, the fibrous mat 12 may cover opposite faces of the fibrous preform 11 thereby covering depressions 14 between the fibers of each face of the fibrous preform 11.

Afterwards, an injection step 22 is performed, in which the ceramic matrix 13 is injected in solution in a binder, into the mold M so as to fill the depressions 14.

This injection step 22 is followed by a step 23 of consolidating the assembly formed by the fibrous preform 11, the fibrous mat 12 and the matrix 13, by thermomechanical treatment.

The consolidation step 23 is carried out in the mold M.

Alternatively, the consolidation step is carried out after demolding.

In the example of a composite part with an alumina oxides-based ceramic matrix, the thermomechanical treatment includes a step of drying the matrix and eliminating the binder products and organic residues by steaming of the set formed by the fibrous preform 11, the fibrous mat 12 and the matrix 13, between 30° C. and 500° C. for 0.2 to 150 h.

Afterwards, the thermomechanical treatment includes a step of sintering 24 at least partially the matrix by heat treatment between 1000° C. and 1400° C., for 5 to 60 minutes in order to generate bonds between each grain of the matrix, and between the matrix and the fibers of the fibrous preform and the fibrous mat.

In one variant, the fibrous mat 12 is previously pre-impregnated with matrix 13 before the step of depositing 21 on the fibrous preform 11.

In another variant, it is possible to locally drape two superimposed fibrous mats 12 to provide complete coverage of the fibrous preform 11 on non-developable shapes that cannot be integrally covered by the fibrous mat 12.

In another variant, the fibrous mat 12 is produced by scattering cut fibers 15 with an aqueous binder, directly on at least one of the mold M and the fibrous preform 11.

The first face 16 or the second face 17 of the mold is a semi-rigid tarpaulin.

In another form of the method, the first step is a step of depositing (21) the fibrous mat on the first face 16 of the mold M then the fibrous preform 11 is manufactured by depositing laps 11' of fibers on the fibrous mat 12.

As illustrated in FIG. 4, the third step 22 is performed by introducing the matrix and its binder through an inlet point 18 located on the second face 17 of the mold M.

Furthermore, the second face 17 of the mold M includes at least one vent 19 enabling the exit of gas, solvents, or binder liquids, so as to press the fibrous mat 12 against the second face 17.

Moreover, the first face 16 of the mold M includes at least one vent 19 enabling the exit of gas, solvents, or binder liquids, so as to press the fibrous mat 12 against the second face 17, and enabling the flow of matrix between the fibers of the fibrous mat 12 and of the fibrous preform 11.

In another form of the method, the vents 19 are microperforations over all of the faces of the mold M which allows uniformly pressing the fibrous mat 12 onto the second face 17.

Figure 5:
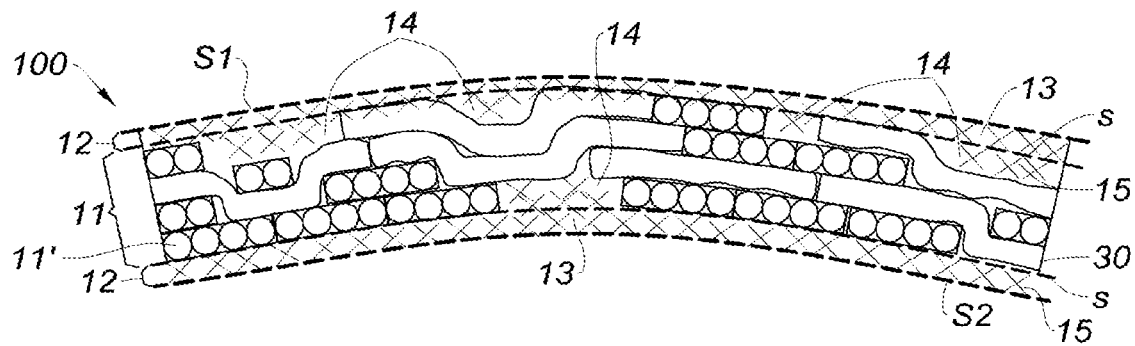
FIG. 5 is a schematic sectional view of a variant of the part made of a composite material of FIG. 1.

FIG. 5 illustrates a variant 100 of the part made of a composite material, having a smooth outer face S1 and inner face S2.

The part 100 includes a fibrous preform 11, a fibrous mat 12, and an alumina-based ceramic matrix 13, which binds the entirety of the fibrous mat 12 and of the fibrous preform 11, the fibrous mat 12 covering the two faces of the fibrous preform 11.

The fibrous preform 11 has a surface "s," on each of its faces, delimiting depressions 14 between some locks 11' of fibers.

The fibrous mat 12 includes fibers 15. It covers the surface "s" of the fibrous preform 11 and in particular the depressions 14, on each face of the fibrous preform 11.

The other features of the part 10 made of a composite material, described with reference to FIG. 1, are applicable to the part 100 according to the variant of FIG. 5.

Figure 6:
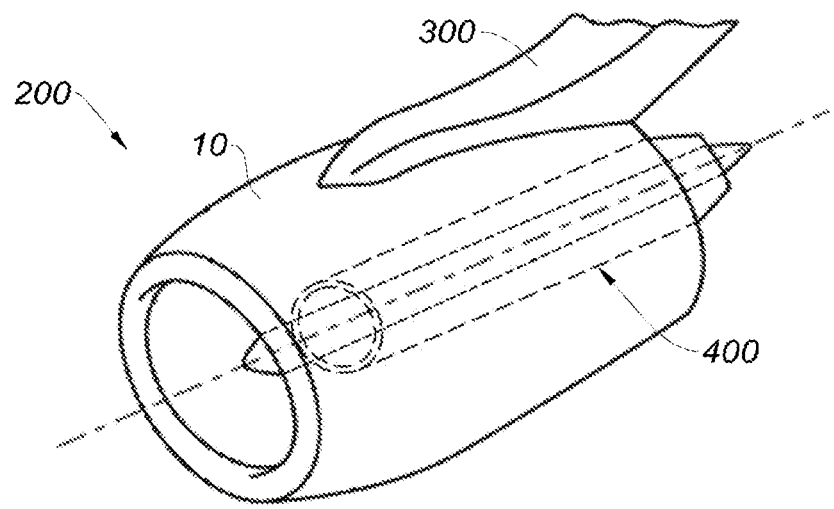
FIG. 6 is a schematic perspective view of a nacelle incorporating a part made of a composite material according to the present disclosure.

FIG. 6 illustrates a nacelle 200 for a turbojet engine 400, including a part 10 made of a composite material according to the present disclosure, as previously described.

The turbojet engine 400 is connected to an aircraft (not represented) by a mast 300.

In one variant, the nacelle 200 includes a part 100 made of a composite material as described with reference to FIG. 5.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A part for an aircraft turbojet engine nacelle, the part being made of a composite material and including at least one outer face, the part comprising:
   a fibrous preform including fiber locks and a surface defining depressions between the fiber locks, the depressions having a height between one and two times a height of the fiber locks;
   a covering material which at least partially covers the surface of the fibrous preform and the depressions; and
   a matrix which binds the covering material and the fibrous preform,
   wherein the covering material is an unwoven fibrous mat including at least one fiber extending substantially parallel to the at least one outer face of the part and above at least one of the depressions between the fiber locks of the fibrous preform, wherein the at least one outer face is smooth.

2. The part according to claim 1, wherein a thickness of the unwoven fibrous mat is smaller than half a thickness of the fiber locks of the fibrous preform.

3. The part according to claim 1, wherein a thickness of the unwoven fibrous mat is smaller than one fifth of a thickness of the fiber locks of the fibrous preform.

4. The part according to claim 1, wherein the fibrous preform includes ceramic fibers.

5. The part according to claim 1, wherein the fibrous preform includes ceramic fibers selected from the group consisting of carbides, borides, oxides, and silicides.

6. The part according to claim 1, wherein the fibrous preform includes silicon carbide (SiC) fibers.

7. The part according to claim 1, wherein the fibrous preform includes alumina or aluminosilicates-based fibers.

8. The part according to claim 1, wherein the fibrous preform includes at least 60% alumina-based fibers.

9. The part according to claim 1, wherein the matrix is a ceramic matrix.

10. The part according to claim 1, wherein the matrix is a ceramic matrix selected from the group consisting of carbides, borides, oxides, and silicides.

11. The part according to claim 1, wherein the matrix is a silicon carbide (SiC) matrix.

12. The part according to claim 1, wherein the matrix is an alumina or aluminosilicates-based matrix.

13. The part according to claim 1, wherein the matrix is at least 60% alumina-based matrix.

14. The part according to claim 1, wherein the unwoven fibrous mat includes ceramic fibers.

15. The part according to claim 1, wherein the unwoven fibrous mat includes ceramic fibers selected from the group consisting of carbides, borides, oxides, and silicides.

16. The part according to claim 1, wherein the unwoven fibrous mat includes silicon carbide (SiC) fibers.

17. The part according to claim 1, wherein the unwoven fibrous mat includes alumina-based fibers.

18. The part according to claim 1, wherein the unwoven fibrous mat includes at least 60% alumina-based fibers.

19. A method for manufacturing a part according to claim 1, the method comprising:
   manufacturing the fibrous preform;
   providing the unwoven fibrous mat;
   depositing the fibrous preform and the unwoven fibrous mat between two faces of a mold;
   dispersing the matrix between fibers of the fibrous preform and fibers of the unwoven fibrous mat; and
   consolidating the fibrous preform and the unwoven fibrous mat, wherein the matrix dispersed between the fibers of the fibrous preform and the fibers of the unwoven fibrous mat is heat-treated.

20. The manufacturing method according to claim 19, wherein the step of manufacturing the fibrous preform is performed in the mold.

21. The manufacturing method according to claim 19, wherein the unwoven fibrous mat is deposited on at least one of the two faces of the mold, and the step of manufacturing the fibrous preform is carried out in the mold, on the unwoven fibrous mat.

22. The manufacturing method according to claim 21, wherein the step of depositing the unwoven fibrous mat is repeated in the mold and on the fibrous preform such that the unwoven fibrous mat is on both faces of the fibrous preform.

23. The manufacturing method according to claim 19, wherein the step of providing the unwoven fibrous mat is carried out by scattering cut fibers on at least one of the mold and the fibrous preform.

24. The manufacturing method according to claim 19, wherein the consolidation step includes a thermomechanical treatment step.

* * * * *